(12) United States Patent
Kim et al.

(10) Patent No.: US 11,799,997 B2
(45) Date of Patent: Oct. 24, 2023

(54) DISPLAY DEVICE

(71) Applicant: Samsung Display Co., LTD., Yongin-si (KR)

(72) Inventors: Won Seok Kim, Seoul (KR); Jung Hoon Shin, Seongnam-si (KR); Ho Yun Byun, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 194 days.

(21) Appl. No.: 17/152,650

(22) Filed: Jan. 19, 2021

(65) Prior Publication Data

US 2021/0377376 A1 Dec. 2, 2021

(30) Foreign Application Priority Data

May 28, 2020 (KR) .................. 10-2020-0064074

(51) Int. Cl.
*H04M 1/02* (2006.01)
*B32B 7/12* (2006.01)

(52) U.S. Cl.
CPC ............. *H04M 1/0266* (2013.01); *B32B 7/12* (2013.01); *B32B 2457/20* (2013.01)

(58) Field of Classification Search
CPC ..... B32B 7/12; B32B 2457/20; H04M 1/0266
See application file for complete search history.

(56) References Cited

U.S. PATENT DOCUMENTS

| 2015/0092122 | A1 | 4/2015 | Youn | |
|---|---|---|---|---|
| 2019/0077121 | A1* | 3/2019 | Lee | ................. G06F 1/1637 |
| 2019/0081255 | A1* | 3/2019 | Kim | ..................... B32B 7/12 |

FOREIGN PATENT DOCUMENTS

| JP | 2017075281 | 4/2017 | |
|---|---|---|---|
| KR | 1020170080245 | 7/2017 | |
| KR | 102024081 | 9/2019 | |
| KR | 1020190107213 | 9/2019 | |
| WO | WO-2019189404 A1 * | 10/2019 | ............ C09J 5/00 |

OTHER PUBLICATIONS

Machine Translation of WO 2019/189404 (Year: 2019).*

* cited by examiner

*Primary Examiner* — Sathavaram I Reddy
(74) *Attorney, Agent, or Firm* — CANTOR COLBURN LLP

(57) ABSTRACT

A display device includes a flat portion defined by a first direction and a second direction crossing the first direction, a bent portion disposed on at least one side of the flat portion and bent in a third direction perpendicular to the first and second directions, a display panel disposed over the flat portion and the bent portion, a cover window disposed on the display panel and disposed over the flat portion and the bent portion, and a bonding member disposed between the display panel and the cover window, where the bonding member has a modulus that increases as a temperature increases.

16 Claims, 19 Drawing Sheets

DISPLAY DEVICE

This application claims priority to Korean Patent Application No. 10-2020-0064074 filed on May 28, 2020, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

Electronic apparatuses providing images to users, such as a smartphone, a tablet personal computer ("PC"), a digital camera, a laptop computer, a navigation device and a smart television, may include display devices for displaying images.

The display devices may include a display panel for producing a screen, a cover window for covering the display panel, and a bonding member for bonding the display panel and the cover window together.

SUMMARY

After the display panel and the cover window are bonded with the bonding member, air bubbles may be trapped in the bonding member. The deeper the air bubbles permeate, the more likely the design of the display device is to be constrained.

Features of the invention provide a display device composed of a display panel and a cover window bonded together with a bonding member having a reduced number of air bubbles trapped therein.

However, features of the invention are not restricted to the one set forth herein. The above and other features of the invention will become more apparent to one of ordinary skill in the art to which the invention pertains by referencing the detailed description of the invention given below.

In an embodiment, a display device includes a flat portion defined by a first direction and a second direction crossing the first direction, a bent portion disposed on at least one side of the flat portion and bent in a third direction perpendicular to the first and second directions, a display panel disposed over the flat portion and the bent portion, a cover window disposed on the display panel and disposed over the flat portion and the bent portion, and a bonding member disposed between the display panel and the cover window, where the bonding member has a modulus that increases as a temperature increases.

According to another embodiment, a display device includes a display panel, a cover window disposed on the display panel and extending outward beyond the display panel, a bonding member disposed between the display panel and the cover window, and a printed pattern disposed between the bonding member and the cover window, where the printed pattern extends from an end portion of the cover window and partially overlaps the display panel, the bonding member is in direct contact with one surface and a side surface of the printed pattern, the bonding member has a modulus of about 800 kilopascals (kPa) to about 1000 kPa under conditions of a temperature ranging from about 60 degrees Celsius (° C.) to about 80° C. and a pressure ranging from about 6 bars to about 8 bars.

In an embodiment, it may be possible to reduce the number of air bubbles trapped in a bonding member for bonding a display panel and a cover window constituting a display device.

The effects of the invention are not limited to the aforementioned effects, and various other effects are included in the specification.

BRIEF DESCRIPTION OF THE DRAWINGS

The above and other embodiments, advantages and features of the invention will become more apparent by describing in detail embodiments thereof with reference to the attached drawings, in which.

DETAILED DESCRIPTION

Figure 1:
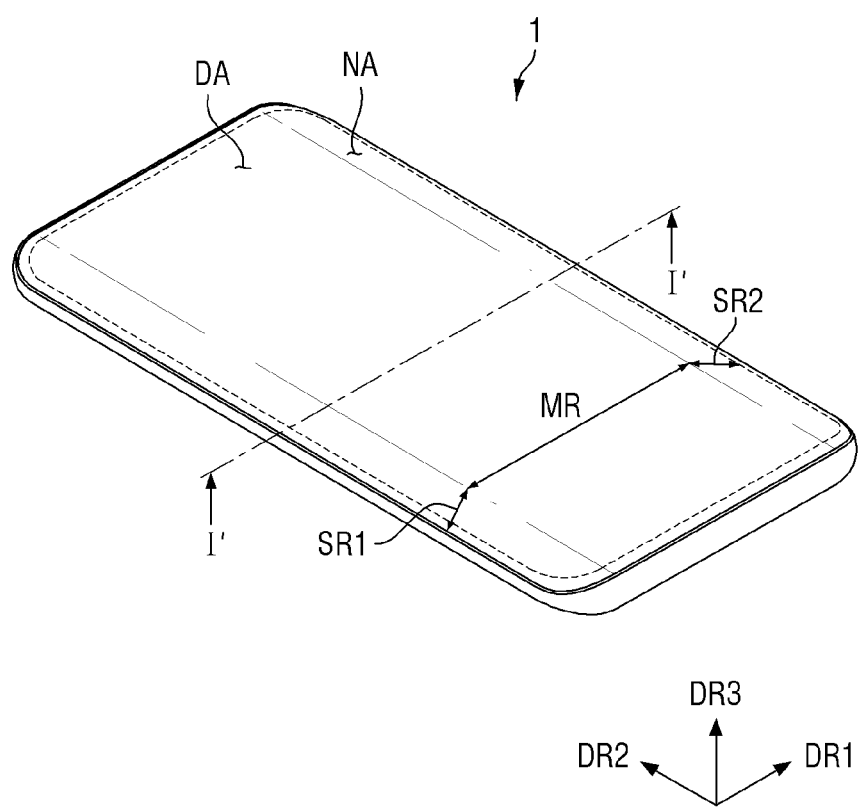
FIG. 1 is a perspective view of an embodiment of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a perspective view of an embodiment of a display device.

Referring to FIG. 1, a display device 1 may have a quadrangular (e.g., rectangular) shape in a plan view. In an embodiment, the display device 1 may include short sides extending along a first direction DR1 and long sides extending along a second direction DR2. A corner where the short side extending along the first direction DR1 and the long side extending along the second direction DR2 meet may be right-angled or rounded with a predetermined curvature. The planar shape of the display device 1 is not limited to a quadrangular (e.g., rectangular shape), and may be provided in other polygonal shapes, a circular shape, or elliptical shape.

In the embodiments, the first direction DR1 and the second direction DR2 cross each other in different directions. In the perspective view of FIG. 1, for convenience of description, the first direction DR1 may refer to an extension direction of the short sides of the display device 1 and the second direction DR2 may refer to an extension direction of the long sides of the display device 1. It should be understood, however, that a direction mentioned in the embodiment refers to a relative direction and the embodiment is not limited to the direction mentioned.

The display device 1 may include a flat portion MR provided flat and a bent portion extending from at least one side of the flat portion MR. The planar shape of the flat portion MR may be similar to the planar shape of the display device 1. The flat portion MR may include short sides extending along the first direction DR1 and long sides extending along the second direction DR2.

In an embodiment, there may be a plurality of bent portions. There may be two bent portions. The bent portion may include a first bent portion SR1 extending from a first long side of the flat portion MR (long side disposed at one side of the flat portion MR in the first direction DR1) and a second bent portion SR2 extending from a second long side of the flat portion MR (long side disposed at the other side of the flat portion MR in the first direction DR1).

The flat portion MR may be disposed on a plane surface. Each of the bent portions SR1 and SR2 may be bent from the flat portion MR in a third direction DR3 (hereinafter, also referred to as a thickness direction). Each of the bent portions SR1 and SR2 may be disposed on a plane surface. Each of the bent portions SR1 and SR2 may be bent from the flat portion MR to have a bent degree (or angle), which may be an obtuse angle, but is not limited thereto, and may be a right angle.

In some embodiments, each of the bent portions SR1 and SR2 may not be disposed on a plane surface and may have a curved surface with a predetermined curvature. The predetermined curvature may be constant, but is not limited thereto and may vary.

The display device 1 may be further defined with a display area DA and a non-display area NA in terms of screen display. The display area DA may be an area where a screen is displayed, and the non-display area NA may be an area where the screen is not displayed. A plurality of transistors may be disposed in the display area DA. The display area DA may be disposed at the center section of the display device 1, and the non-display area NA may be disposed around the display area DA. In an embodiment, the non-display area NA may completely surround the display area DA, for example. The center section of the flat portion MR and the sections of the bent portions SR1 and SR2 adjacent to the long sides of the flat portion MR may completely overlap the display area DA. The edge sections of the short sides of the flat portion MR and the remaining sections of the bent portions SR1 and SR2 with the exclusion of the sections adjacent to the long sides of the flat portion MR may completely overlap the non-display area NA.

Figure 2:
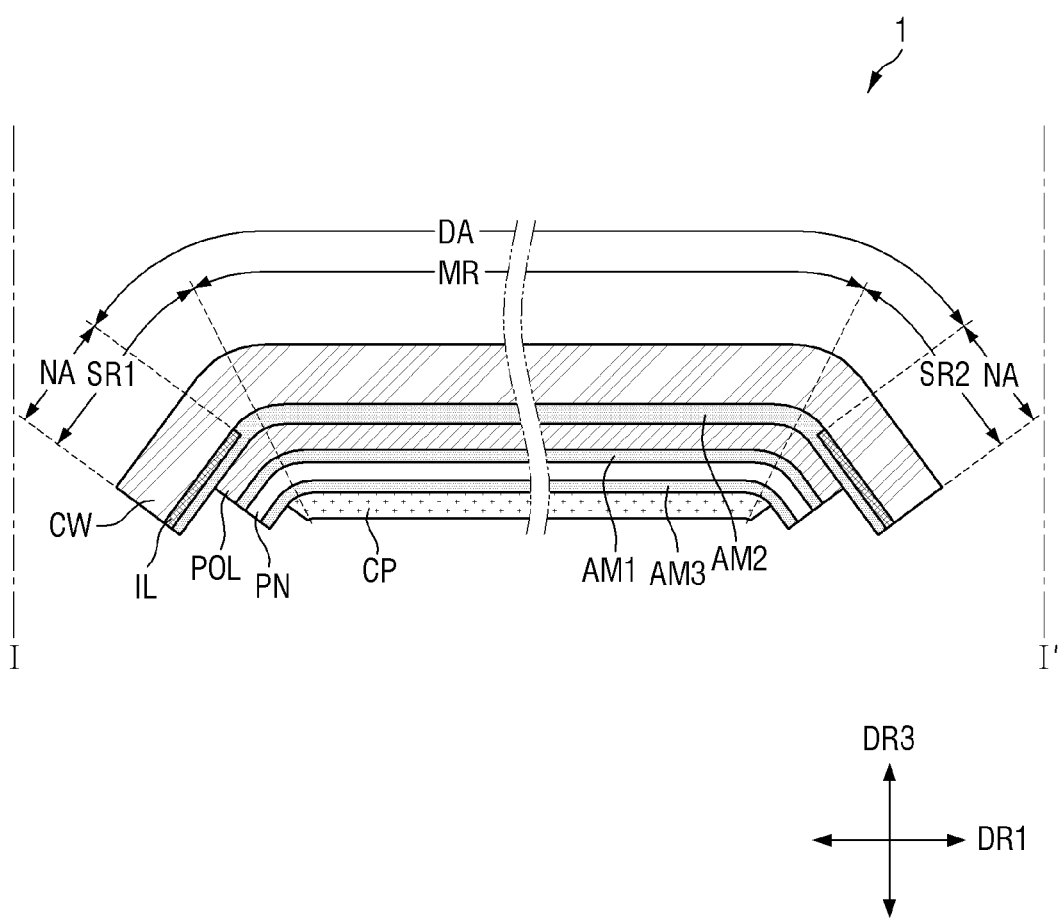
FIG. 2 is a cross-sectional view taken along line I-I' of FIG. 1.

FIG. 2 is a cross-sectional view taken along line I-I' of FIG. 1.

With reference to FIG. 2, the display device 1 may include a display panel PN, a polarization layer POL, a cover window CW, and a lower cover panel CP. The display device 1 may further include a first bonding member AM1 arranged between the display panel PN and the polarization layer POL, a second bonding member AM2 arranged between the polarization layer POL and the cover window CW, and a third bonding member AM3 arranged between the display panel PN and the lower cover panel CP.

The aforementioned display panel PN, the polarization layer POL, the cover window CW, the lower cover panel CP, and the bonding members AM1 to AM3 may be arranged all over the flat portion MR and the bent portions SR1 and SR2.

The display panel PN may include a circuit driving layer arranged on a substrate. The circuit driving layer may include a circuit that drives a light emitting layer of a pixel. The circuit driving layer may include a plurality of thin film transistors. A light emitting layer may be arranged on the circuit driving layer. The light emitting layer may include an organic light emitting layer. The light emitting layer may emit light with various luminance levels according to a driving signal transmitted from the circuit driving layer. An encapsulation layer may be arranged on the light emitting layer. The encapsulation layer may include an inorganic layer or a laminated layer of an inorganic layer and an organic layer. In another embodiment, the encapsulation layer may be implemented with a glass or an encapsulation film. A touch layer may be arranged on the encapsulation layer. The touch layer is a layer for recognizing a touch input, and may function as a touch member. The touch layer may include a plurality of sensing areas and sensing electrodes.

The polarization layer POL may be arranged on the display panel PN. The polarization layer POL may serve to reduce the reflection of external light. The polarization layer POL may be bonded on the display panel PN with the first bonding member AM1. The first bonding member AM1 may be arranged between the polarization layer POL and the display panel PN. The first bonding member AM1 may be an optically transparent bonding member. In an embodiment, the first bonding member AM1 may be an optically clear adhesive or optically clear resin without being limited thereto, for example.

The cover window CW may be arranged on the polarization layer POL. The cover window CW may be arranged on top of the display panel PN to protect the display panel PN and it may allow light emitted from the display panel PN to pass therethrough. The cover window CW may include a rigid material such as glass or quartz. In some embodiments, the cover window CW may include plastic.

The cover window CW may overlap the display panel PN and cover the entire surface of the display panel PN. The cover window CW may have a shape substantially similar to that of the display panel PN, but may have a larger size than the display panel PN.

In an embodiment, the cover window CW may protrude outward beyond the display panel PN on both short sides of the display device 1, for example. The cover window CW may also protrude outward beyond the display panel PN along the long sides of the display device 1, and the protruding length of the short sides may be greater than that of the long sides. The cover window CW may have a quadrangular (e.g., rectangular) shape including two long sides and two short sides, which may be identical with the shape of the display device 1 in a plan view.

On one surface (or bottom surface) of the cover window CW facing the display panel PN, a printed pattern IL may be further arranged. The printed pattern IL may be arranged in the non-display area NA of the display device 1. The area in which the printed pattern IL is arranged may be defined as the non-display area NA of the display device 1. The printed pattern IL may extend from an end of the cover window CW to partially overlap the display panel PN.

The second bonding member AM2 may be arranged between the cover window CW and the polarization layer POL. The second bonding member AM2 may bond the polarization layer POL and the cover window CW together. The second bonding member AM2 may optically transparent bonding member. In an embodiment, the second bonding member AM2 may be an optically clear adhesive or optically clear resin without being limited thereto, for example.

The printed pattern IL may include one surface contacting one surface of the cover window CW, the other surface (surface facing the display panel PN) that is a surface opposite to the one surface of the printed pattern IL, and side surfaces. The side surfaces of the printed pattern IL may include an outer side surface and an inner side surface. The outer side surface of the printed pattern IL may be aligned with the outer side surface of the cover window CW, and the inner side surface of the printed pattern IL may be aligned with the boundary between the non-display area NA and the display area DA.

The second bonding member AM2 may cover the other surface and the inner side surface of the printed pattern IL. The second bonding member AM2 may directly contact the other surface and the inner side surface of the printed pattern IL.

In an embodiment, the display device 1 may be manufactured in such a way of bonding the cover window CW and the lower members (polarization layer POL, display panel PN, etc.) of the cover window CW and proceeding to perform an autoclave process on the bonded cover window CW and lower members. That is, in an embodiment, the second bonding member AM2 of the display device 1 may be provided through the mutual bonding process and the autoclave process. It may be desired for the second bonding member AM2 to have different material properties in the mutual bonging process and the autoclave process. A detailed description thereof will be given later.

The lower cover panel CP may be arranged beneath the display panel PN. The lower cover panel CP may be adhered on the rear surface of the display panel PN in the display area DA. The lower cover panel CP includes at least one functional layer. The functional layer may be a layer that performs a heat dissipation function, an electromagnetic shielding function, a grounding function, a buffering function, a rigidity enhancing function, a supporting function, and/or a digitizing function. The functional layer may be a sheet layer, a film layer, a thin layer, a coating layer, a panel, a plate, or the like. One functional layer may consist of a single layer or a stack of multiple thin films or coating layers. The functional layer may be, for example, a supporting member, a heat dissipation layer, an electromagnetic shielding layer, an impact absorbing layer, a digitizer, or the like.

Figure 3:
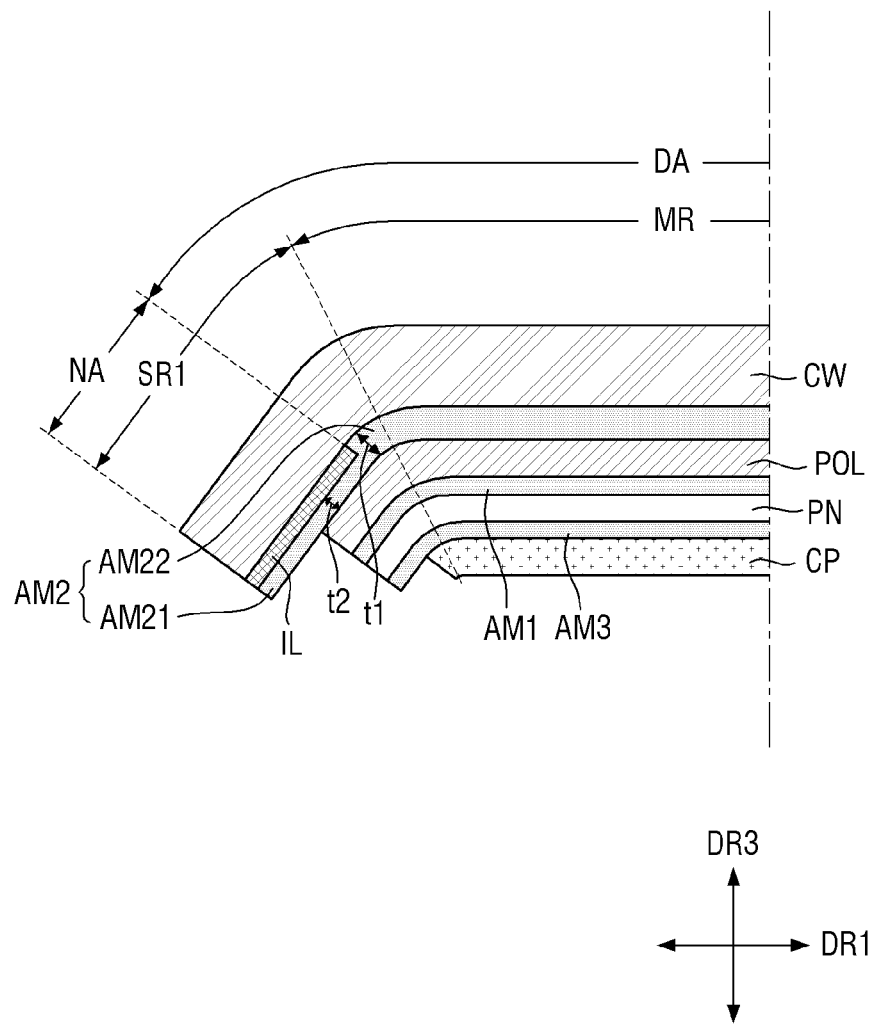
FIG. 3 is an enlarged cross-sectional view of part of a flat portion and a first bent portion of FIG. 2.

FIG. 3 is an enlarged cross-sectional view of part of the flat portion and the first bent portion of FIG. 2.

With reference to FIGS. 2 and 3, as described above with reference to FIG. 2, the printed pattern IL may be arranged on one surface (bottom surface) of the cover window CW which faces the display panel PN in the non-display area NA. That is, the printed pattern IL protruding from one surface of the cover window CW in the non-display area NA may generate a height difference. The above-described second bonding member AM2 may cover the height difference generated by the printed pattern IL protruding from one surface of the cover window CW in the non-display area NA.

In an embodiment, the second bonding member AM2 may include a first sub-bonding member AM21 having a first thickness t1 in the display area DA and a second sub-bonding member AM22 having a second thickness t2 smaller than the first thickness t1 in the non-display area NA, for example. In an embodiment, the first thickness t1 may be about 25 micrometers (μm) to about 250 μm without being limited thereto, for example.

The second bonding member AM2 may have an adhesive strength equal to or greater than about 2000 grams-force per inch (gf/in) with respect to glass as an adherend.

As described above, it may be desired for the second bonding member AM2 to have different material properties in the mutual bonging process and the autoclave process.

First, in the process of bonding the cover window CW and the lower members (polarization layer POL, display panel PN, etc.) of the cover window CW, it may be preferable that the second bonding member AM2 has a low modulus, a relatively high creep characteristic, and a relatively low stress relaxation value.

Figure 9:
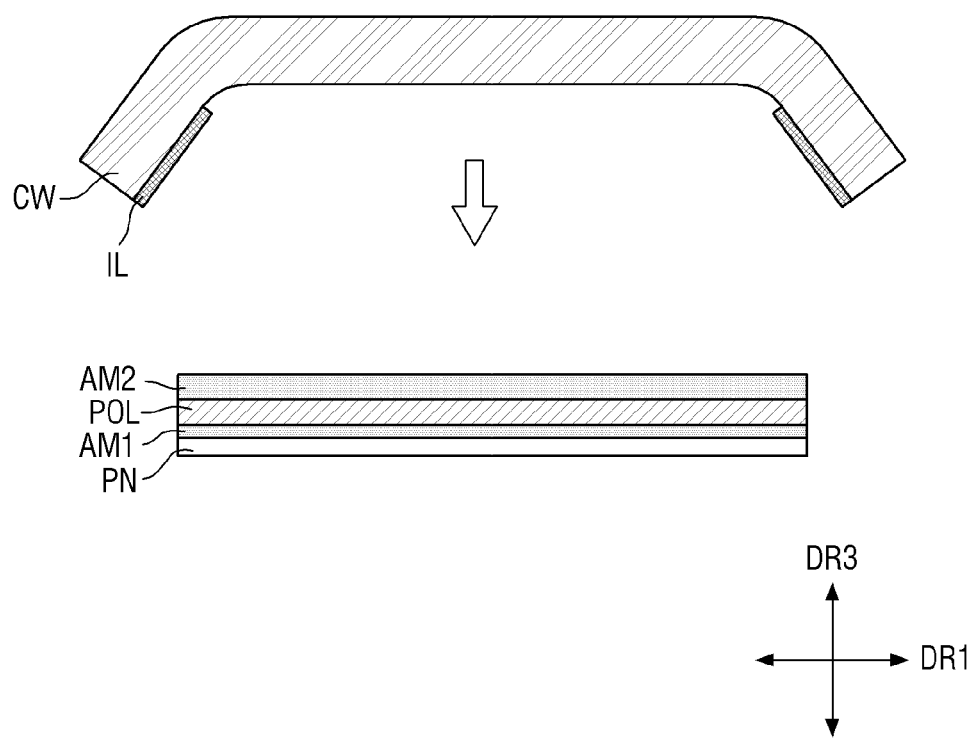
FIG. 9 is a schematic view illustrating an embodiment of bonding a cover window and lower members of the cover window.
Figure 10:
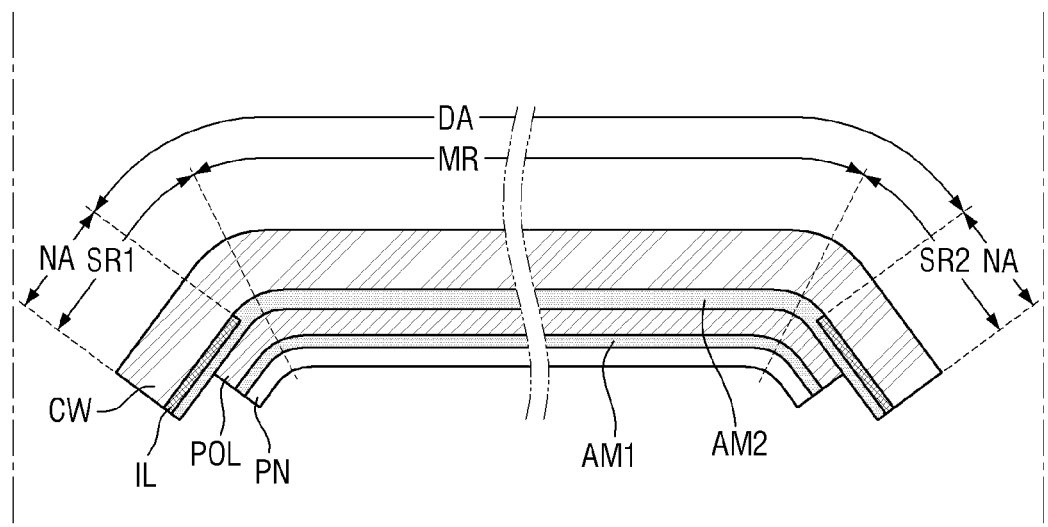
FIG. 10 is a cross-sectional view illustrating an embodiment of a cover window and lower members of the cover window that are bonded together.
Figure 10:
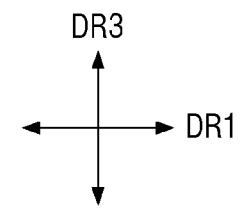
Figure 11:
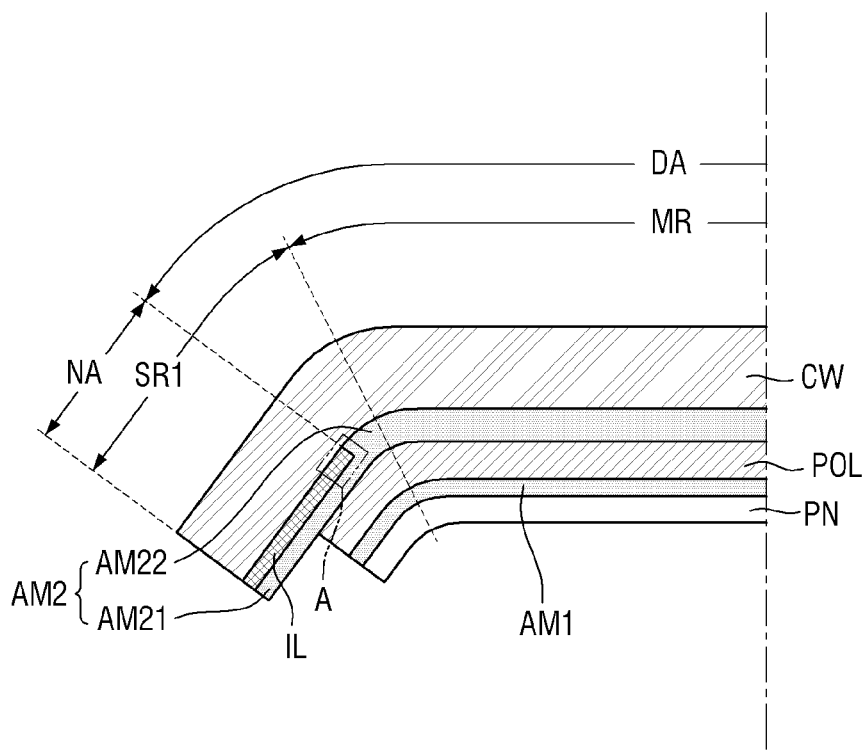
FIG. 11 is an enlarged cross-sectional view of part of a flat portion and a first bent portion of FIG. 10.
Figure 12:
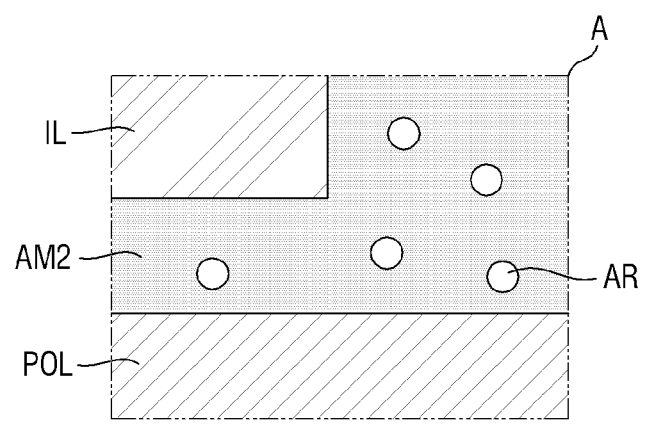
FIG. 12 is an enlarged cross-sectional view of region A of FIG. 11.

FIG. 9 is a schematic view illustrating an embodiment of bonding a cover window and lower members of the cover window. FIG. 10 is a cross-sectional view illustrating an embodiment of a cover window and lower members of the cover window that are bonded together. FIG. 11 is an enlarged cross-sectional view of part of the flat portion and the first bent portion of FIG. 10. FIG. 12 is an enlarged cross-sectional view of region A of FIG. 11.

With reference to FIGS. 2 and 9, in the process of bonding the cover window CW and the lower members, the cover window CW may have a cross-section corresponding to the cross-section of the display device 1 with the flat portion MR and the bent portions SR1 and SR2 while the lower members may have a cross-section in a straight linear shape extending along the first direction DR1. Although it is shown in FIG. 9 that the cover window CW moves down in the third direction DR3, the invention is not limited thereto, and it may also be possible for the lower members to move up toward the fixed cover window CW or for the cover window CW and the lower members to respectively move up and down to be bonded together.

The cover window CW and the lower members may be bonded as shown in FIGS. 10 and 11. The lower members having a cross-section in a straight linear shape extending along the first direction DR1 as described with reference to FIG. 9 may be transformed to have a cross-section corresponding to the shape of the cover window CW with the flat portion MR and the bent portions SR1 and SR2 during the bonding process.

In the process of bonding the cover window CW and the lower members (polarization layer POL, display panel PN, etc.) of the cover window CW, when the second bonding member AM2 has a low modulus, a relatively high creep characteristic, and a relatively low stress relaxation value, the height difference caused by the printed pattern IL may be efficiently absorbed by the second bonding member AM2, leading to advantages for initial adhesion between the cover window CW and the lower members of the cover window CW by the second bonding member AM2 at the bent portions SR1 and SR2 of the display device 1.

In the process of bonding the cover window CW and the lower members (polarization layer POL, display panel PN, etc.) of the cover window CW, when the second bonding member AM2 has a low modulus, a relatively high creep characteristic, and a relatively low stress relaxation value, this may reduce the formation of air bubbles during the initial adhesion between the cover window CW and the lower members of the cover window CW with the second bonding member AM2 at the bent portions SR1 and SR2 of the display device 1.

The process of bonding the cover window CW and the lower members (polarization layer POL, display panel PN, etc.) of the cover window CW may be performed at a room temperature under an atmospheric pressure. In an embodiment, the room temperature may be about 25 degrees Celsius (° C.), and the atmospheric pressure may be about 1 atmospheric pressure (atm) or about 1 bar, for example. Under the room temperature and atmospheric pressure conditions for the process of bonding the cover window CW and the lower members (polarization layer POL, display panel PN, etc.) of the cover window CW, in the second bonding member AM2, the modulus may be about 150 kilopascals (kPa) to about 210 kPa, the creep characteristic may be about 20 percent (%) to about 30%, and the stress relaxation value may be equal to or less than about 5000 kPa.

Figure 15:
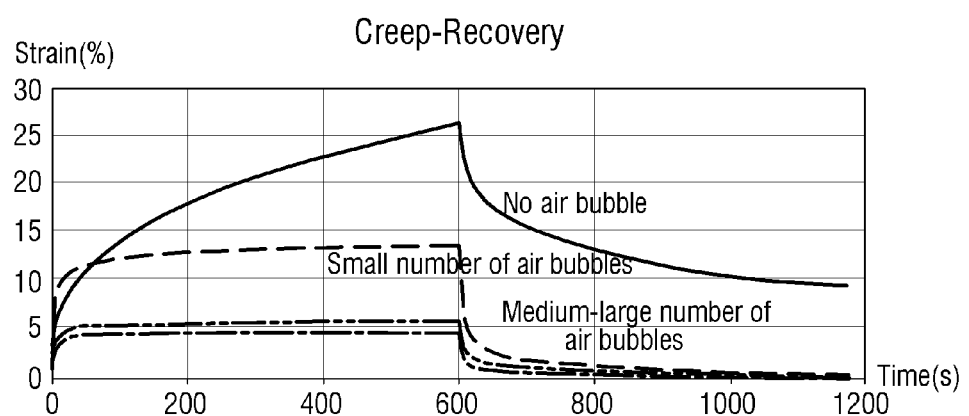
FIG. 15 is a graph showing a creep characteristic varying according to time per sample.
Figure 16:
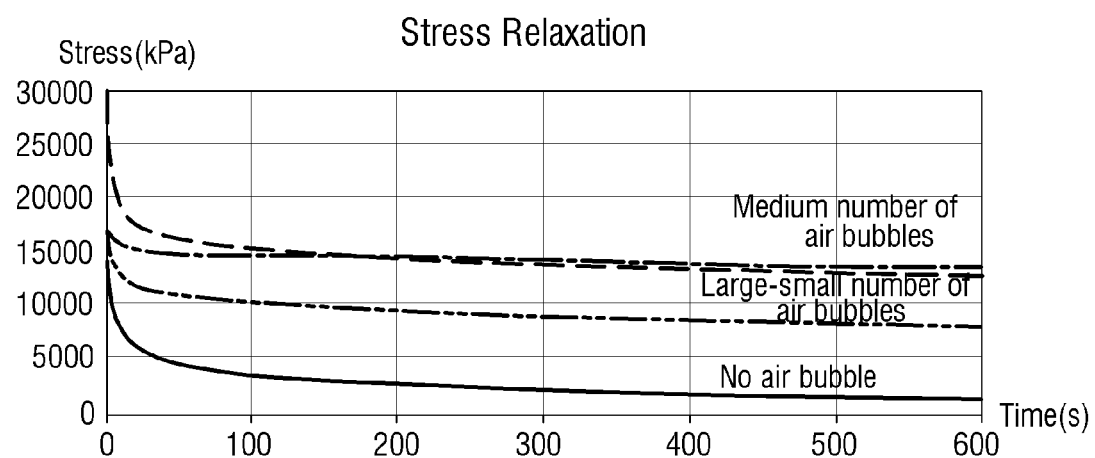
FIG. 16 is a graph showing a stress relaxation varying according to time per sample.

FIG. 15 is a graph showing a creep characteristic varying according to time per sample. FIG. 16 is a graph showing a stress relaxation varying according to time per sample.

In FIG. 15, the horizontal axis represents time in terms of second (s), and the vertical axis represents the creep characteristic in terms of %. In FIG. 16, the horizontal axis represents time (s), and the vertical axis represents the stress in terms of kPa.

First, with reference to FIG. 15, it was identified that there was no air bubble in the sample having a creep characteristic of 20 to 30 in a time period from about 400 seconds to about 600 seconds under the room temperature and atmospheric pressure conditions.

Furthermore, with reference to FIG. 16, it was identified that there was no air bubble in the sample having a stress relaxation value that was about 15000 kPa at the initial stage and decreased to be equal to or less than about 5000 kPa after about 20 seconds under the room temperature and atmospheric pressure conditions. The stress relaxation value measurement may be performed in the state where the deformation rate (shear stress) of about 25% is applied to the sample for about 600 seconds.

With reference to FIG. 12, some air bubbles AR may be provided in the second bonding member AM2. In order to remove the air bubbles AR provided during the bonding process, an autoclave process may be performed as described below.

Figure 13:
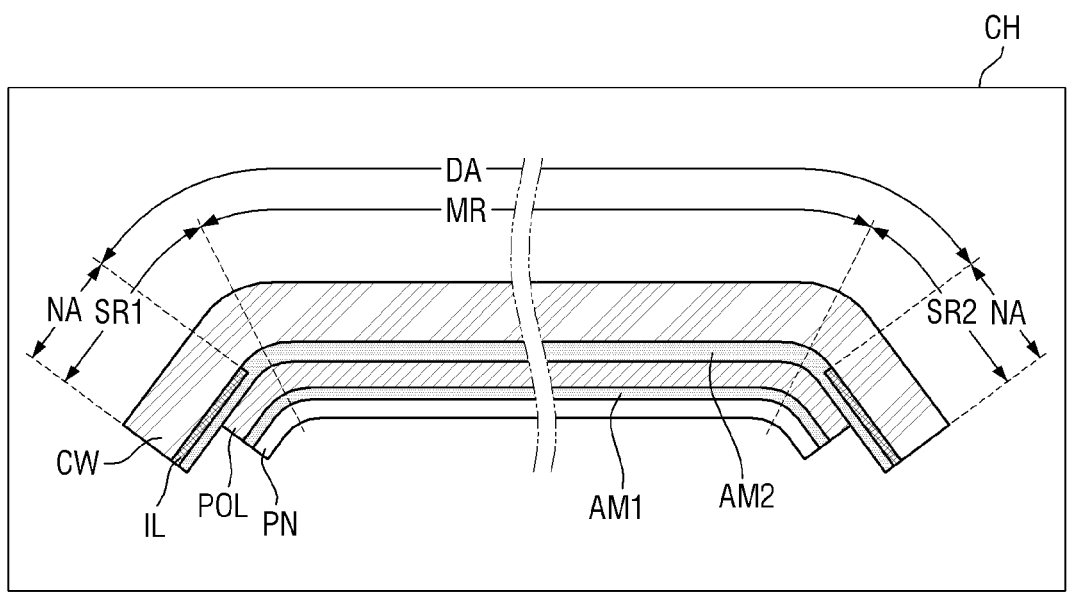
FIG. 13 is a cross-sectional view showing an embodiment of an autoclave process.
Figure 13:
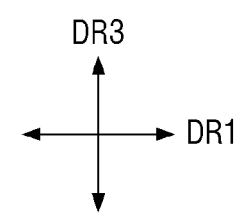

Next, with reference to FIGS. 3 and 13, the autoclave process may be performed on the second bonding member AM2 after the process of bonding the cover window CW with the lower members (polarization layer POL, display panel PN, etc.) of the cover window CW.

The autoclave process may be performed in a chamber CH maintaining a temperature higher than the room temperature and a pressure higher than the atmospheric pressure. In an embodiment, the autoclave process may be performed at a temperature equal to or higher than about 60° C. and a pressure equal to or greater than about 6 bars, for example. The autoclave process under the above temperature and pressure conditions may also have a temperature condition equal to or less than about 80° C. and a pressure condition equal to or less than about 8 bars due to the nature of facilities. In an embodiment, the autoclave process may be performed for about 10 minutes, for example. However, the autoclave process may, when necessary, be performed under various temperature, pressure, and time conditions.

The autoclave process may make it possible to reduce the number of air bubbles provided at the bent portions SR1 and SR2 of the display device 1 during the initial adhesion of bonding the cover window CW and the lower members of the cover window CW with the second bonding member AM2.

In an embodiment, it may be possible to reduce the number of air bubbles in such a way of contracting the air bubbles provided in the second bonding member AM2 with a temperature higher than the room temperature and a pressure higher than the atmospheric pressure to increase the number of molecules, which allows the air bubbles themselves to dissolve into the second bonding member AM2, for example. However, it may occur that external air permeates through the end portions of the second bonding member AM2 under the conditions of the high temperature and high pressure of the autoclave process. In an embodiment, at a temperature higher than the room temperature under a pressure higher than the atmospheric temperature, the moduli of the adhesive layers decrease to soften the adhesive layers, which facilitates permeation of the external air, for example. The external air permeating through the end portions of the second bonding member AM2 during the autoclave process may form air bubbles at the room temperature under the atmospheric pressure after the completion of the autoclave process such that the air bubbles are likely to be visually perceived at the end portions of the second bonding member AM2.

Accordingly, it is preferable that the second bonding member AM2 has a characteristic in which the modulus increases as the temperature and/or the pressure increases.

Figure 14:
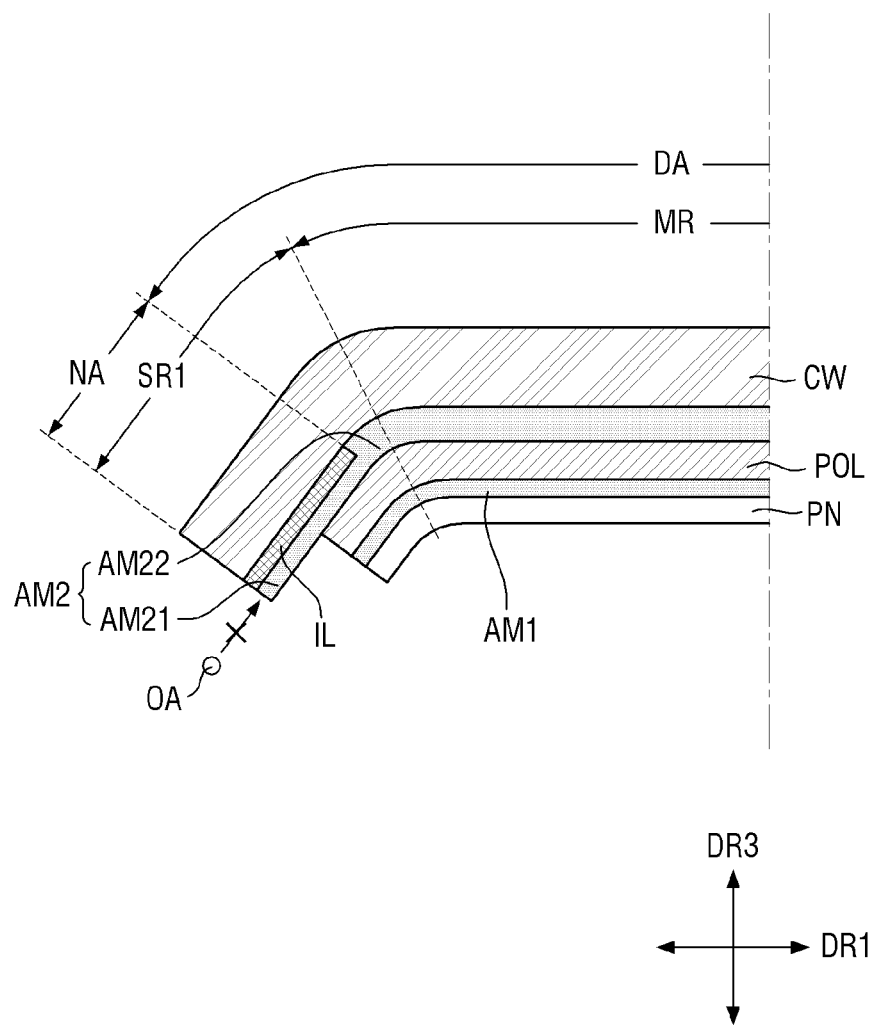
FIG. 14 is a cross-sectional view showing prevention of external gas permeation into the second bonding member.

It may be preferable that the second bonding member AM2 has a relatively high modulus and low creep characteristic during the autoclave process. When the second bonding member AM2 has a relatively high modulus and low creep characteristic during the autoclave process, as shown in FIG. 14, this may prevent external air OA from permeating through the end portions of the second bonding member AM2, which leads to reduction of the number of permeated air bubbles and a diffusion distance of the permeated air bubbles. In the case where the permeated air bubbles are generated, although the permeated air bubbles diffused into the non-display area NA may not be visually perceived due to the printed pattern IL, the permeated air bubbles diffused into the display area DA are likely to be visually perceived by the user.

When the second bonding member AM2 has a relatively high modulus and low creep characteristic during the autoclave process, this may reduce the space through which the air bubbles are permeable and, even though any air bubbles permeate, limit the growth and distribution of the permeated air bubbles. Typically, as the curvature radius of the bent portions decreases, the air bubbles are readily provided during the process of bonding the cover window CW and the lower members, which desires increasing the temperature and pressure to remove the air bubbles during the autoclave process. In an embodiment, the second bonding member AM2 has a low modulus and high creep characteristic during the bonding process (room temperature and atmospheric pressure), thereby reducing air bubble formation. Furthermore, even though the autoclave process is performed under higher temperature and pressure conditions, the modulus of the second bonding member AM2 may increase to thereby dramatically reduce the air bubble permeation through the end portions thereof. This makes it possible to further reduce the curvature radius of the bent portions and the diffusion distance of the permeated air bubbles, which may allow the bezel area (e.g., non-display area NA) to be further reduced.

In order to meet the characteristic requirement of increasing the modulus and decreasing the creep characteristic as the temperature and/or pressure increases, the second bonding member AM2 may include a first monomer of Chemical Formula 1 below.

<Chemical Formula 1>

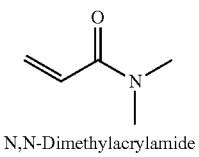

N,N-Dimethylacrylamide

In the autoclave process, the second bonding member AM2 may have the modulus of about 800 kPa to about 1000 kPa and the creep characteristic equal to or less than about 10%.

Furthermore, because the second bonding member AM2 includes the first monomer to meet the characteristic requirement of increasing the modulus and decreasing the creep characteristic as the temperature and/or pressure increases, the second bonding member AM2 is excellently cured without any separate post-curing process after the autoclave process, which leads to reduction of processing time and simplification of facilities.

Because the second bonding member AM2 is excellently cured only with the autoclave process, it may be possible to maintain the adhesive characteristic of the second bonding member AM2 at the stepped portion caused by the printed pattern IL and the bent portions SR1 and SR2.

In an embodiment, the stress relaxation value of the second bonding member AM2 in the autoclave process may be less than the stress relaxation value in the process of bonding the cover window CW with the lower members (polarization layer POL, display panel PN, etc.) of the cover window CW.

Furthermore, in order to prevent external air from permeating through the end portions of the second bonding member AM2 during the autoclave process, consideration may include using a method for blocking the permeation of air bubbles by reducing internal pores in such a way of increasing the cross-linking degree and/or molecular weight of the second bonding member AM2.

After the autoclave process, the second bonding member AM2 may retain a relatively high modulus and low creep characteristic under the room temperature and atmospheric pressure conditions. As a consequence, the adhesive characteristic of the second bonding member AM2 may be retained at the stepped portion caused by the printed pattern IL and the bent portions SR1 and SR2.

In an embodiment, after the autoclave process, the second bonding member AM2 may retain a modulus of about 600 kPa to about 750 kPa and a creep characteristic of about 12% to about 15% under the room temperature and atmospheric pressure conditions, for example.

The second bonding member AM2 may have the curing degree or gel content (wt %) that varies according to the content of the first monomer.

Figure 4:
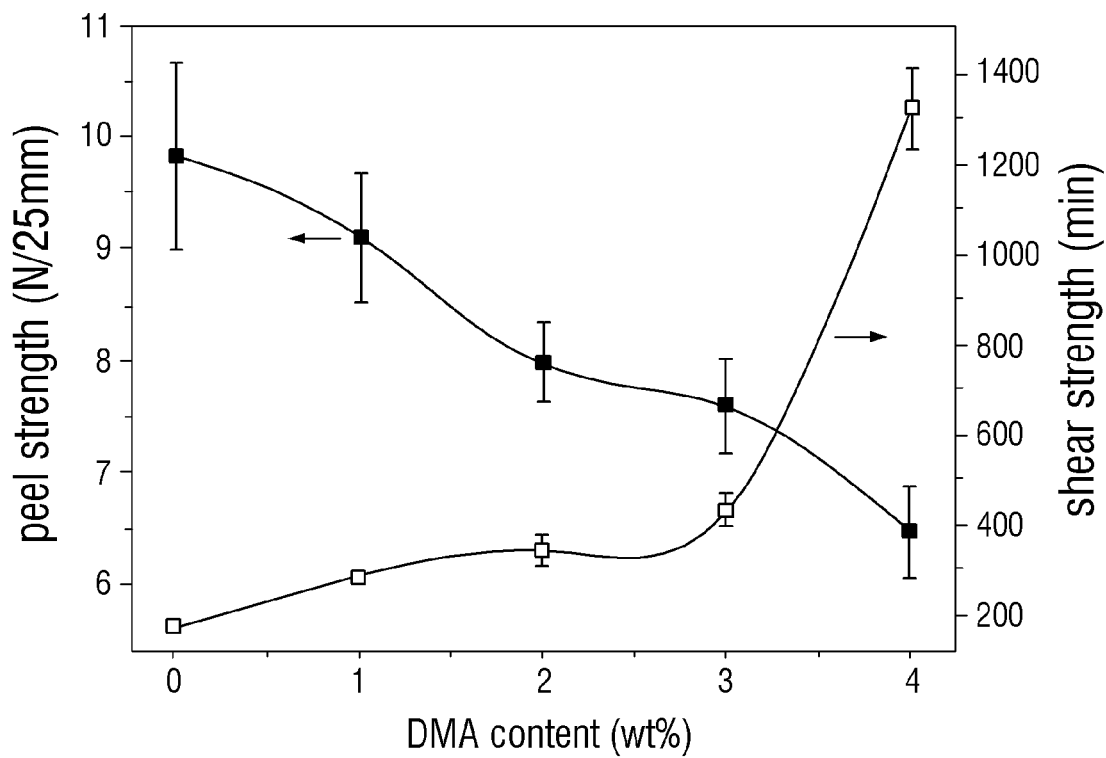
FIG. 4 is a graph showing peel stress and shear stress varying according to the content of a first monomer.
Figure 5:
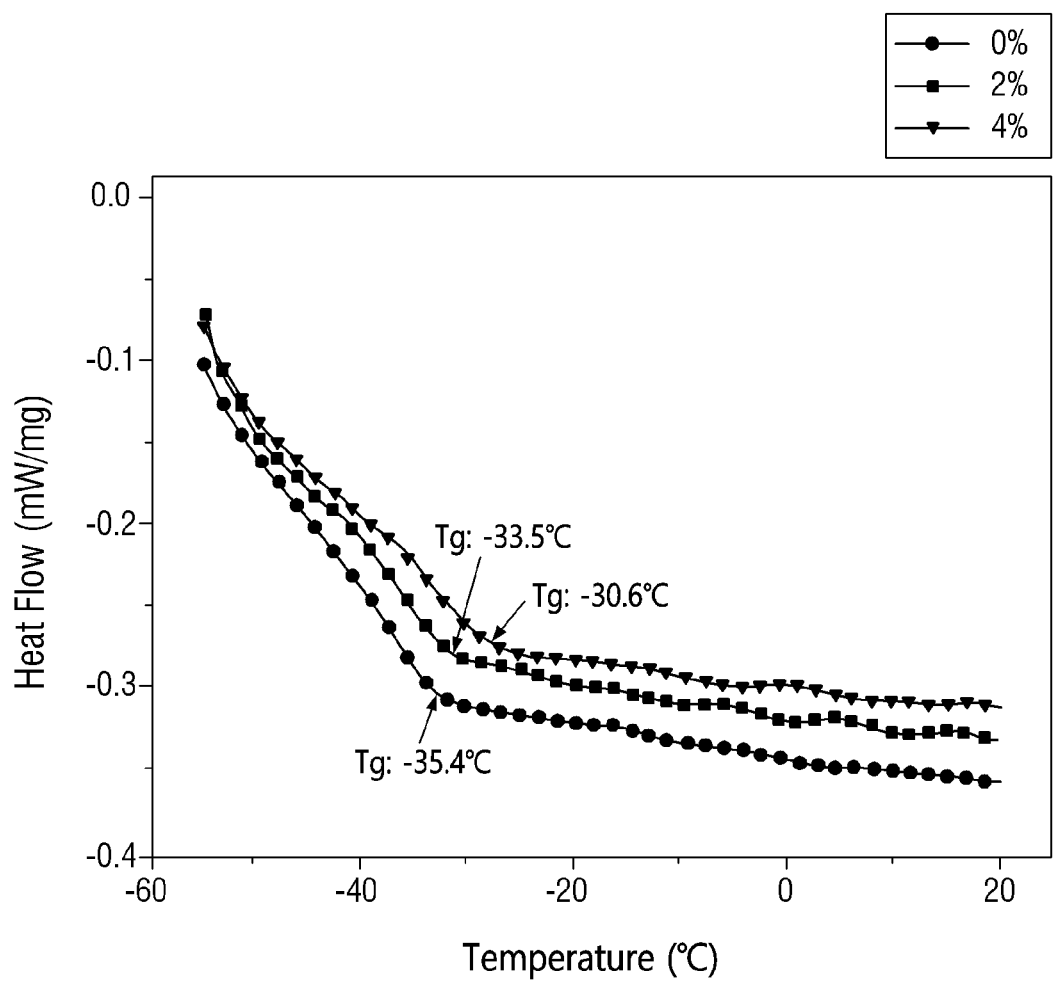
FIG. 5 is a graph showing a transition temperature varying according to the content of a first monomer.

FIG. 4 is a graph showing peel stress and shear stress varying according to the content of a first monomer. FIG. 5 is a graph showing a transition temperature varying according to the content of a first monomer.

A description is made with reference to FIGS. 4 to 5. Table 1 showing the gel content varying according to the content of the first monomer is also referenced as follows.

TABLE 1

| DMA content (wt %) | Gel content (wt %) |
|---|---|
| 0 | 54.55 ± 1.070 |
| 1 | 55.08 ± 1.700 |
| 2 | 57.25 ± 0.592 |
| 3 | 58.33 ± 0.940 |
| 4 | 60.88 ± 1.590 |

First, with reference to Table 1, it may be seen that the gel content (wt %) gradually increases as the content (wt %) of the first monomer increases. The gel content (wt %) has a correlation with the curing degree of the second bonding member AM2 and, as the gel content increases, the permeation of the external air through the end portions of the second bonding member AM2 may decrease.

With reference to FIG. 4, it may be seen that the peel stress in terms of newton per 25 millimeter (N/25 mm) decreases and the shear stress (min or minimum value) increases as the content of the first monomer increases. Here, the unit of the shear stress is pascal (Pa). Because it is identified that the shear stress increases as the content of the first monomer increases, it may be proved that the gen content (wt %) increases as the content of the first monomer increases. Particularly, it was identified that the shear stress tends to slightly increase to about 400 when the content of the first monomer is less than about 3 wt %, but dramatically increases when the content of the first monomer is equal to or greater than about 3 wt %, and reaches about 1300 when the content of the first monomer is about 4 wt %.

In an embodiment, the content of the first monomer may be about 3 wt % to about 4 wt %. As shown in Table 1, when the content of the first monomer is about 3 wt % to about 4 wt %, the gel content may be about 57.43 wt % to about 62.47 wt %.

With reference to FIG. 5, it may be seen that the transition temperature (Tg in terms of degree Celsius (° C.)) varies according to the content of the first monomer. In FIG. 5, the horizontal axis may represent temperature in terms of degree Celsius (° C.), and the vertical axis may represent heat flow in terms of milliwatt per milligram (mW/mg). As shown in FIG. 5, it was identified that the transition temperature of the second bonding member AM2 increases (−35.4° C. at 0%, −33.5° C. at 2%, and −30.6° C. at 4%) as the content of the first monomer increases.

Hereinafter, a description includes the method for measuring the modulus and creep characteristic by means of an indenter.

Figure 6:
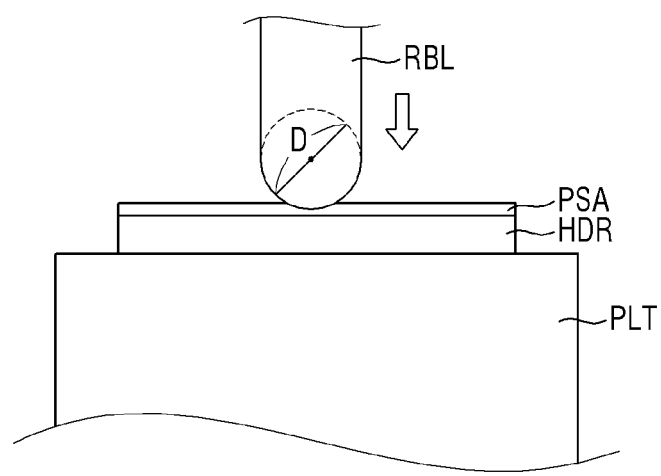
FIG. 6 is a schematic view illustrating an embodiment of a method for measuring a modulus and creep characteristic of an adhesive layer by means of a bio-indenter.

FIG. 6 is a schematic view illustrating an embodiment of a method for measuring a modulus and creep characteristic of an adhesive layer by means of a bio-indenter.

With reference to FIG. 6, the bio-indenter includes an indenter RBL. The indenter RBL may have a shape of a ball (Ruby ball) or at least part of the ball. The ball shape of the indenter RBL may has a diameter D of about 0.5 millimeter (mm) without being limited thereto.

In an embodiment, an adhesive layer PSA, as a measurement target, is cut out to have a size of 2 centimeter (cm)×2 cm. In the case where a heterogeneous film is adhered to the adhesive layer PSA, after the heterogeneous film is removed, the adhesive layer PSA is attached to a flat holder HDR, which is placed on a plate PLT. Next, the indenter RBL presses the surface of the adhesive layer PSA with a maximum load of 0.5 millinewton (mN), which is maintained for about 60 seconds. Here, the loading/unloading speed, i.e., the pressing speed, of the indenter RBL may be about 1.2 millinewton per minute (mN/min). During the pressing operation, a penetration depth is measured. The indentation test with the indenter RBL of the bio-indenter may be carried out at a plurality of points, e.g., 15 points, on a sample, and the penetration depth may be represented by an average of a plurality of test results.

Figure 7:
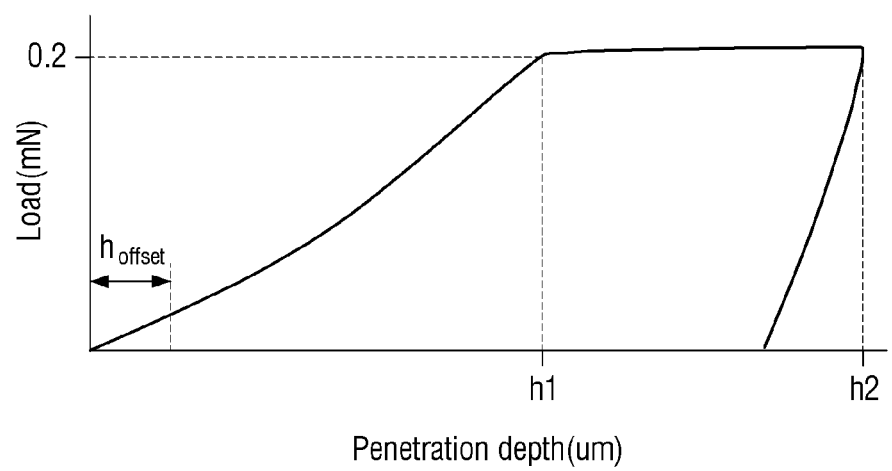
FIG. 7 is a graph showing a relationship between a penetration depth and a load.
Figure 8:
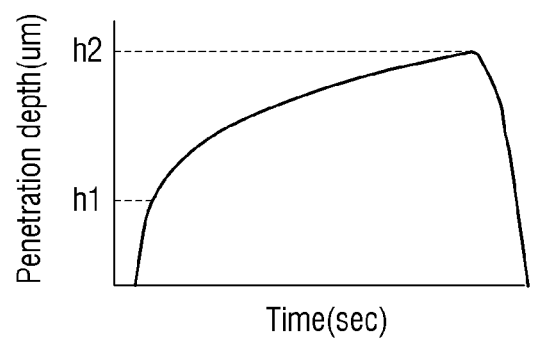
FIG. 8 is a graph showing a penetration depth varying according to time before and after a maximum load maintenance period.

FIG. 7 is a graph showing a relationship between a penetration depth and a load. FIG. 8 is a graph showing a penetration depth varying according to time before and after a maximum load maintenance period.

In FIGS. 7 and 8, h1 denotes a penetration depth at the time point when the maximum load is reached, and h2 is a penetration depth at the time point when the maximum load maintenance period expires.

With reference to FIGS. 7 and 8, as the indentation load of the indenter RBL increases, the penetration depth of the indenter RBL increases. Because the deformation rate to the stress increases as the modulus of the adhesive layer decreases, the penetration depth to the indentation load increases as the modulus decreases. The penetration depth continues to increase while the maximum load to the indenter RBL is maintained because of the viscosity of the adhesive layer PSA. The penetration depth tends to increase during the maximum load maintenance period mostly as the creep characteristic increases. The penetration depth increase rate during the maximum load maintenance period gradually decreases (slope decreasing in FIG. 8) as time progresses, and the penetration depth may be maintained at a specific value without further increasing at a predetermined time point even though the maintenance period elongates. When the indenter RBL is unloaded, the penetration depth decreases, and the stronger the restoration force, the faster the penetration depth may decrease after the indenter RBL is completely unloaded.

After the penetration depth is measured as described above, a modulus E* may be calculated through equation Eq. 1 as follows.

$$P = \tfrac{4}{3} E^* \sqrt{R} \sqrt{h^3} \qquad \text{Eq. 1}$$

In equation Eq. 1, P denotes the maximum load, R denotes the radius of the indenter RBL, and h denotes the penetration depth. Here, the penetration depth denotes a maximum load reaching depth h1. In the case where the bio-indenter has a predetermined offset depth (hoffset), the penetration depth of equation Eq. 1 may be represented as a value obtained by subtracting the offset depth (hoffset) from the maximum load reaching depth h1 measured by the bio-indenter. The offset depth (hoffset) is an offset perceived as when the surface of the adhesive layer is indented by the van der Waals force even though the indenter RBL approaches without pressing yet when the bio indenter measures the penetration depth. The actual penetration depth may be calculated by subtracting the offset depth (hoffset) from the penetration depth measured by the bio-indenter. In order to reduce the measurement error caused by the offset depth (hoffset), it may be possible to calculate the modulus by setting a loading slope range to 30% to 98% (0.06 mN~0.196 mN) of the maximum load in the penetration depth-load graph.

The creep characteristic ($C_{IT}$) may also be calculated through equation Eq. 2.

$$C_{IT} = \frac{h_2 - h_1}{h_1} \cdot 100 \qquad \text{Eq. 2}$$

The modulus and creep characteristic of the second bonding member AM2 of the display device 1 may be measured in the above-described manner.

Hereinafter, the embodiments will be described in more detail through fabrication examples and experimental examples.

Table 2 hereinbelow shows adhesive material property per sample. Hereinafter, descriptions are made with reference to FIGS. 2 and 3 and Table 2.

Fabrication Example 1: Fabrication of Display Devices

A plurality of display device samples having the layered structure shown in FIG. 2 was fabricated.

Fabrication Example 2: Extraction of Adhesive Samples

A sample of the second bonding member AM2 was extracted by separating the cover window CW from each display device sample. The extracted adhesives #A to #E have different material properties. The moduli and creep characteristics of the adhesives A # to E # were measured at a room temperature (about 25° C.), at a high temperature (60° C.), and at the room temperature recovered from the high temperature.

Experimental Example 1: Measurement of Modulus and Creep Characteristic

Each adhesive sample was cut out to have a size of 2 cm×2 cm, and the modulus and creep characteristic measurement was performed thereon with an indenter evaluation method. The indenter evaluation method was carried out by applying and maintaining a maximum load of 0.5 mN to each sample for 60 seconds with a ball indenter including a ruby material. The loading/unloading speed was maintained at 1.2 mN/min. Per-point indent penetration depths were measured, and the modulus and creep characteristic were measured using a value obtained by averaging the per-point indent penetration depths. The result was shown in the graph of FIG. 16.

Experimental Example 2: Measurement of Number of Permeated Air Bubbles

The number of permeated air bubbles in the respective samples #A to #E were measured on the layered structure of the display device including the samples #A to #E as shown in FIG. 2. The number of air bubbles permeated to a point

TABLE 2

| | Item | A (mass-produced OCA) | B | C | D | E (new OCA) |
|---|---|---|---|---|---|---|
| Room temperature 25° C | CIT (%) | 66 ± 0.3 | 31 ± 0.3 | 25 ± 0.2 | 59 ± 0.5 | 28 ± 0.2 |
| | Elastic modulus (kPa) | 187 ± 3.1 | 501 ± 2.1 | 449 ± 3.4 | 220 ± 1.8 | 181 ± 1.7 |
| High temperature 60° C. | CIT (%) | 68 ± 1 | 15 ± 0.9 | 15 ± 0.5 | 47 ± 0.7 | 7 ± 1.4 |
| | Elastic modulus (kPa) | 92 ± 2.8 | 474 ± 4.6 | 447 ± 5.2 | 128 ± 2.1 | 944 ± 132 |
| Recovered to room temperature | CIT (%) | 67 ± 0.7 | 34 ± 0.5 | 26 ± 0.2 | 61 ± 0.4 | 12 ± 1.5 |
| | Elastic modulus (kPa) | 201 ± 1.6 | 502 ± 4.4 | 471 ± 3.2 | 224 ± 2.4 | 765 ± 110 |
| Elastic modulus ratio (high temperature/room temperature) | | 49.7% (50.3%↓) | 94.7% | 99.4% | 58.2% (41.8%↓) | 547.7% |
| Elastic modulus ratio (high temperature/room temperature) | | 107.9% | 100.3% | 104.7% | 101.8% | 421.3% |
| Number of permeated air bubbles (ea) | | 5~10 | 30↑ | 5~10 | 30↑ | 0 | at a distance of 100 mms from the end portion of each of the samples #A to #E (end portion of the second bonding member AM2 of FIG. 2) was measured by means of a microscope. The result was shown in the graph of FIG. 16. As a result, it was identified, among the samples #A to #E, that the number of permeated air bubbles was 0 in sample #E having the modulus and creep characteristic of about 181±1.7 kPa and about 28±0.2 respectively under the room temperature and atmospheric pressure conditions; about 944±132 kPa and 7±1.4 respectively during the autoclave process; and about 765±110 kPa and about 12±1.5 under the room temperature and atmospheric pressure conditions after the autoclave process.

Figure 17:
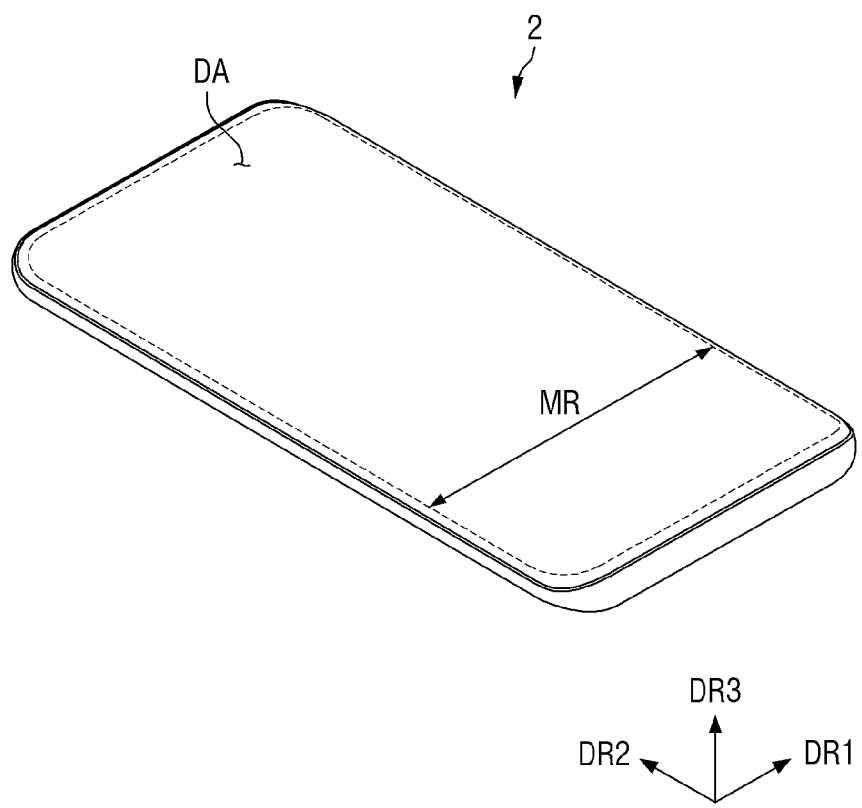
FIG. 17 is a perspective view of another embodiment of a display device.
Figure 18:
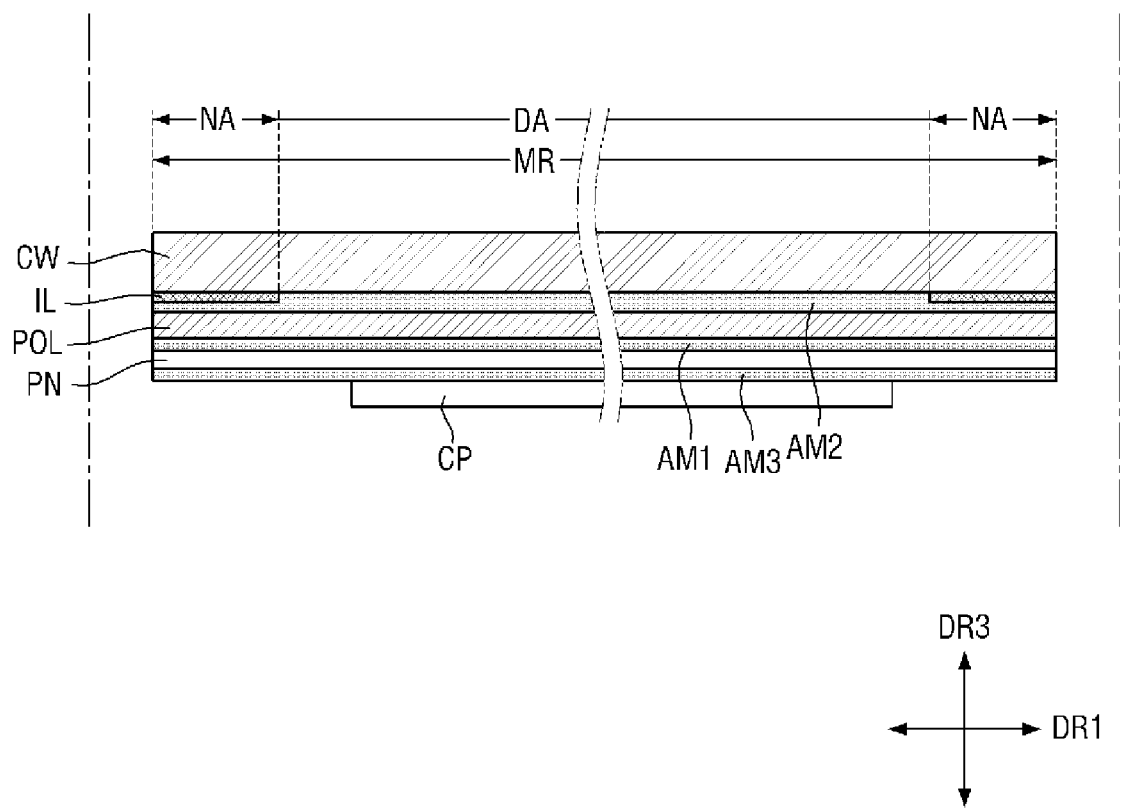
FIG. 18 is a cross-sectional view of the display device of FIG. 17.

FIG. 17 is a perspective view of another embodiment of a display device. FIG. 18 is a cross-sectional view of the display device of FIG. 17.

With reference to FIGS. 17 and 18, a display device 2 according to another embodiment differs from the display device 1 of the embodiment of FIGS. 1 and 2 in having only the flat portion MR with the exclusion of the bent portions SR1 and SR2 of FIGS. 1 and 2.

In more detail, the display device 2 according to another embodiment may include only the flat portion MR with the exclusion of the bent portions SR1 and SR2 of FIGS. 1 and 2.

Other configurations are the same as those described above with reference to FIGS. 1 to 16, and thus, a repeated description is omitted.

Figure 19:
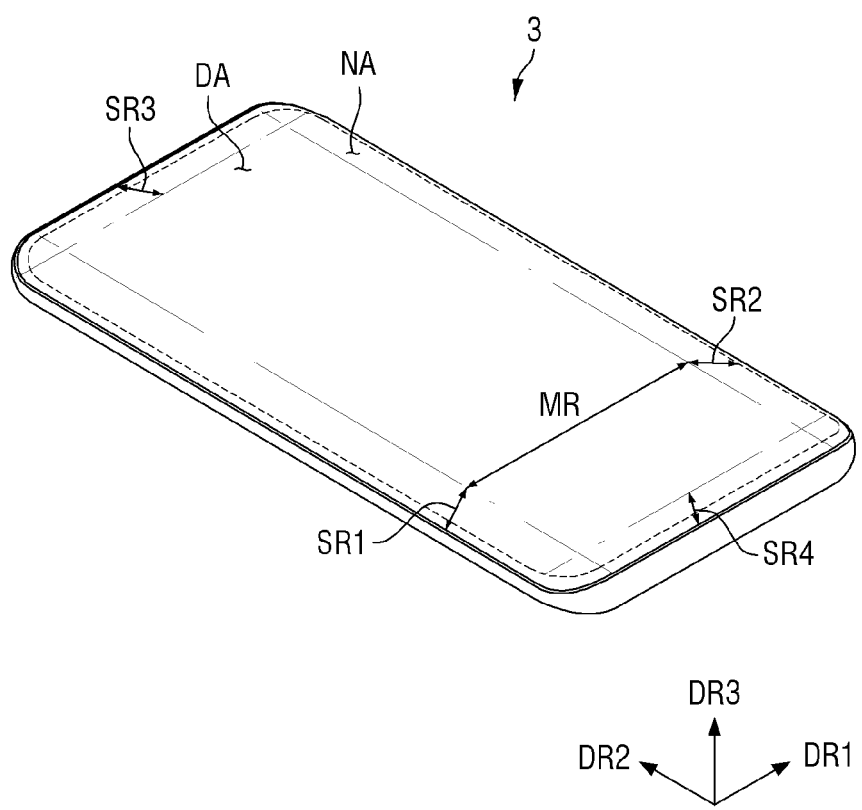
FIG. 19 is a perspective view of another embodiment of a display device.

FIG. 19 is a perspective view of another embodiment of a display device.

With reference to FIG. 19, a display device 3 according to this embodiment differs from the display device 1 of the embodiment of FIGS. 1 and 2 in having four bent portions.

In more detail, the display device 3 according to this embodiment may include four bent portions.

According to this embodiment, the bent portions may further include a third bent portion SR3 extending from a first short side of the flat portion MR (short side disposed at one side of the flat portion MR in the second direction DR2) and a fourth bent portion SR4 extending from a second short side of the flat portion MR (short side disposed at the other side of the flat portion MR in the second direction DR2).

Each of the bent portions SR3 and SR4 may be bent from the flat portion MR in the thickness direction (third direction DR3). Each of the bent portions SR3 and SR4 may be disposed on a plane surface. Each of the bent portions SR3 and SR4 may be bent from the flat portion MR to have a bent degree (or angle), which may be an obtuse angle, but is not limited thereto, and may be a right angle.

In some embodiments, each of the bent portions SR3 and SR4 may not be disposed on a plane surface and may have a curved surface with a predetermined curvature. The predetermined curvature may be constant, but is not limited thereto and may vary.

According to this embodiment, double-bent portions may be provided at positions where the adjacent bent portions SR1 to SR4 meet each other, e.g., a position where the first and third bent portions SR1 and SR3 meet, a position where the first and fourth bent portions SR1 and SR4 meet, a position where the second and third bent portions SR2 and SR3 meet, and a position where the second and fourth bent portions SR2 and SR4 meet. In order to prevent air bubble formation in the double-bent portions at the initial stage of bonding the cover window (refer to CW in FIG. 2) and the lower members of the cover window CW with the second bonding member (refer to AM2 in FIG. 2), the second bonding member according to this embodiment may have the same structure as the second bonding member AM2 described with reference to FIGS. 1 to 16. Thus, defects of the display device may be prevented in advance.

Although embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device comprising:
a flat portion defined by a first direction and a second direction crossing the first direction;
a bent portion disposed on at least one side of the flat portion and bent in a third direction perpendicular to the first and second directions;
a display panel including portions respectively corresponding to the flat portion and the bent portion of the display device;
a cover window disposed on the display panel and including portions respectively corresponding to the flat portion and the bent portion of the display device; and
a bonding member disposed between the display panel and the cover window,
wherein the bonding member has a modulus which increases as a temperature increases,
wherein the bonding member includes a first monomer of Chemical Formula 1 below:

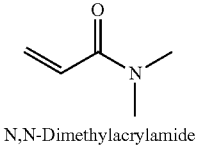

<Chemical Formula 1>

N,N-Dimethylacrylamide and
wherein a weight ratio of the first monomer to a total weight of the bonding member ranges from about 3 wt % to about 4 wt % and a shear stress of the bonding member ranges from about 400 pascals to about 1400 pascals.

2. The display device of claim 1, wherein the modulus of the bonding member ranges from about 800 kilopascals to about 1000 kilopascals under conditions of a temperature ranging from about 60 degrees Celsius to about 80 degrees Celsius and a pressure ranging from about 6 bars to about 8 bars, and
the modulus of the bonding member ranges from about 150 kilopascals to about 210 kilopascals under a room temperature and atmospheric pressure conditions.

3. The display device of claim 2, wherein
the modulus of the bonding member ranges from about 600 kilopascals to about 750 kilopascals and is maintained under the room temperature and the atmospheric pressure conditions after an autoclave process of the bonding member is completed.

4. The display device of claim 1, wherein the bonding member has a creep characteristic of 10 percent or less under conditions of a temperature ranging from about 60 degrees Celsius to about 80 degrees Celsius and a pressure ranging from about 6 bars to about 8 bars.

5. The display device of claim 4, wherein the creep characteristic of the bonding member ranges from about 20 percent to about 30 percent under a room temperature and atmospheric pressure conditions.

6. The display device of claim 5, wherein
the creep characteristic of the bonding member ranges from about 12 percent to about 15 percent under the room temperature and the atmospheric pressure conditions after an autoclave process of the bonding member is completed.

7. The display device of claim 6, wherein the bonding member has a stress relaxation value equal to or less than about 5000 kilopascals under normal temperature and normal pressure conditions.

8. The display device of claim 1, wherein the bonding member has an adhesive strength of about 2000 gram-force per inch or more with respect to glass as an adherend.

9. The display device of claim 1, wherein a gel content (wt %) of the bonding member ranges from about 57.43 wt % to about 62.47 wt %.

10. The display device of claim 1, wherein the bent portions are respectively disposed on a first side of the flat portion and a second side opposite to the first side,
the first side is adjacent to a first long side of the flat portion, and
the second side is adjacent to a second long side opposite to the first long side of the flat portion.

11. The display device of claim 10, wherein the bent portions are further disposed on a third side of the flat portion and a fourth side opposite to the third side,
the third side is adjacent to a first short side of the flat portion, and
the fourth side is adjacent to a second short side opposite to the first short side of the flat portion.

12. A display device comprising:
a display panel;
a cover window disposed on the display panel and extending outward beyond the display panel;
a bonding member disposed between the display panel and the cover window; and
a printed pattern disposed between the bonding member and the cover window,
wherein the printed pattern extends from an end portion of the cover window and partially overlaps the display panel,
the bonding member is in direct contact with one surface and a side surface of the printed pattern,
the bonding member has a modulus of about 800 kilopascals to about 1000 kilopascals under conditions of a temperature ranging from about 60 degrees Celsius to about 80 degrees Celsius and a pressure ranging from about 6 bars to about 8 bars,
wherein the bonding member includes a first monomer of Chemical Formula 1 below:

<Chemical Formula 1>

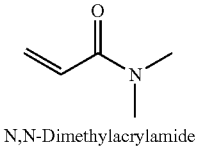

N,N-Dimethylacrylamide and
a weight ratio of the first monomer to a total weight of the bonding member ranges from about 3 wt % to about 4 wt % and a shear stress of the bonding member ranges from about 400 pascals to about 1400 pascals.

13. The display device of claim 12, wherein
a gel content (wt %) of the bonding member ranges from about 57.43 wt % to about 62.47 wt %.

14. The display device of claim 12, wherein the modulus of the bonding member ranges from about 150 kilopascals to about 210 kilopascals under a room temperature and atmospheric pressure conditions, and
the modulus of the bonding member ranges from about 600 kilopascals to about 750 kilopascals and is maintained under the room temperature and the atmospheric pressure conditions after an autoclave process of the bonding member is completed.

15. The display device of claim 12, wherein the bonding member has a creep characteristic of about 10 percent or less under conditions of a temperature ranging from about 60 degrees Celsius to about 80 degrees Celsius and a pressure ranging from about 6 bars to about 8 bars,
the creep characteristic of the bonding member ranges from about 20 percent to about 30 percent under a room temperature and atmospheric pressure conditions, and
the creep characteristic of the bonding member ranges from about 12 percent to about 15 percent under the room temperature and the atmospheric pressure conditions after an autoclave process of the bonding member is completed.

16. The display device of claim 15, wherein the bonding member has a stress relaxation value equal to or less than about 5000 kilopascals under normal temperature and normal pressure conditions.

* * * * *